United States Patent

Ikemoto et al.

[11] Patent Number: 4,628,751
[45] Date of Patent: Dec. 16, 1986

[54] GEAR SYNCHRONIZER FOR POWER TRANSMISSION

[75] Inventors: Kazuhito Ikemoto; Yukio Terakura, both of Toyota, Japan

[73] Assignee: Toyota Jidosha Kabushiki Kaisha, Aichi, Japan

[21] Appl. No.: 673,514

[22] Filed: Nov. 20, 1984

[30] Foreign Application Priority Data

Nov. 29, 1983 [JP] Japan ................... 58-224875

[51] Int. Cl.$^4$ .................... F16H 3/38; F16D 11/00
[52] U.S. Cl. .................... 74/339; 192/53 F
[58] Field of Search ............. 74/339; 192/53 E, 53 F

[56] References Cited

U.S. PATENT DOCUMENTS

| | | | |
|---|---|---|---|
| 2,201,169 | 5/1940 | Griswold | 74/339 X |
| 3,272,291 | 9/1966 | Flinn | 192/53 F |
| 3,620,338 | 11/1971 | Tomita et al. | 192/53 F |
| 4,238,012 | 12/1980 | Takiguchi | 192/53 F X |
| 4,299,317 | 11/1981 | Katayama | 192/53 F |
| 4,300,668 | 11/1981 | Nozawa et al. | 192/53 F |
| 4,445,602 | 5/1984 | Chana | 192/53 F |
| 4,530,253 | 7/1985 | Ikemoto et al. | 192/53 F X |

FOREIGN PATENT DOCUMENTS 1332492  6/1963  France ................... 192/53 E

Primary Examiner—Kenneth J. Dorner
Assistant Examiner—Stephen B. Andrews
Attorney, Agent, or Firm—Parkhurst & Oliff

[57] ABSTRACT

In a gear synchronizer assembly of the well-known type, an internal splined portion of a clutch sleeve includes first internal splines engageable with external splines of a synchronizer ring and second internal splines engageable with external splines of a spline piece. The first internal splines of the clutch sleeve are formed smaller in axial length than the second internal splines of the clutch sleeve to reduce the shift stroke of the clutch sleeve as short as possible and to avoid increase of relative rotation between the clutch sleeve and the spline piece.

4 Claims, 6 Drawing Figures

GEAR SYNCHRONIZER FOR POWER TRANSMISSION

BACKGROUND OF THE INVENTION

The present invention relates to gear synchronizer assemblies, and more particularly to a gear synchronizer mechanism of the type which comprises a gear member rotatable on a transmission shaft, a spline piece formed with a conical portion and integral with the gear member for rotation therewith, a synchronizer ring mounted on the spline piece conical portion and cooperable with the same for providing a cone clutch, a hub member fixed to the shaft, a clutch sleeve encircling the hub member and drivingly connected thereto, the clutch sleeve having an internal splined portion in continual engagement with external splines formed on the hub member and axially shiftable to be engaged with external splines respectively formed on the synchronizer ring and the spline piece, and a plurality of circumferentially equi-spaced strut keys assembled with the inner circumference of the clutch sleeve and loaded radially outwardly into engagement with the clutch sleeve to abut against and urge the synchronizer ring toward the spline piece in shifting operation of the clutch sleeve.

In such a conventional gear synchronizer mechanism as described above, the diameter of the external splines of the synchronizer ring is substantially the same as that of the external splines of the spline piece, and the internal splines of the clutch sleeve are formed in the same construction. In shifting operation of the clutch sleeve, the internal splines of the clutch sleeve are subsequently brought into engagement with the external splines of the synchronizer ring and the external splines of the spline piece. Therefore, the clutch sleeve must be shifted in a relatively long distance corresponding with the sum of the axial length of the external splines on the synchronizer ring, the axial length of the external splines on the spline piece, and the clearances between the clutch sleeve in its neutral position and the synchronizer ring and between the synchronizer ring and the spline piece. For this reason, it is difficult to enhance an operational feel in shift operation of the clutch sleeve. In the conventional gear synchronizer mechanism, it has been experienced that relative rotation between the clutch sleeve and the spline piece increases before the chamfered ends of the internal splines of the clutch sleeve are engaged with the chamfered ends of the external splines of the spline piece after passing through the external splines on the synchronizer ring. This results in occurrence of unpleasant gear noises or unexpected problems in shifting operation.

SUMMARY OF THE INVENTION

It is, therefore, a primary object of the present invention to provide an improved gear synchronizer mechanism wherein the external splines of the synchronizer ring and the internal splines of the clutch sleeve are designed to reduce the shift stroke of the clutch sleeve as short as possible thereby to enhance an operational feel in shifting operation and to avoid increase of relative rotation between the clutch sleeve and the spline piece.

It is a further object of the present invention to provide an improved gear synchronizer mechanism, having the above-described characteristics, wherein the internal splines of the clutch sleeve are arranged to be formed with a chamfer at each end in a simple manner during the manufacturing process of the clutch sleeve.

According to the present invention there is provided a gear synchronizer mechanism which comprises a gear member rotatable on a transmission shaft and having a hub portion, a spline piece formed at one side thereof with a conical portion and fixedly mounted on the hub portion of the gear member for rotation therewith, a synchronizer ring mounted on the conical portion of the spline piece and cooperable with the same for frictional engagement, a hub member formed with external splines and fixed to the shaft, a clutch sleeve encircling the hub member and drivingly connected thereto, the clutch sleeve having an internal splined portion in continual engagement with the external splines of the hub member and axially shiftable to be engaged with external splines respectively formed on the synchronizer ring and the spline piece, and a plurality of circumferentially spaced strut keys assembled with the inner circumference of the clutch sleeve and loaded radially outwardly into engagement with the clutch sleeve to abut against and urge the synchronizer ring toward the spline piece in shifting operation of the clutch sleeve. The gear synchronizer assembly is characterised in that the internal splined portion of the clutch sleeve includes first internal splines engageable with the external splines of the synchronizer ring and second internal splines engageable with the external splines of the spline piece and that the first internal splines of the clutch sleeve are formed smaller in axial length than the second internal splines of the clutch sleeve.

In operation of the gear synchronizer assembly, the first and second internal splines of the clutch sleeve are simultaneously brought into engagement with the external splines of the synchronizer ring and the external splines of the spline piece, respectively. This serves to reduce the shift stroke of the clutch sleeve in shifting operation and to avoid increase of relative rotation between the clutch sleeve and the spline piece.

In the actual practices of the present invention, it is preferable that the external splined portion of the synchronizer ring is formed smaller in diameter than the external splined portion of the spline piece.

BRIEF DESCRIPTION OF THE DRAWINGS

Additional objects, features and advantages of the present invention will become more readily apparent from the following detailed description of a preferred embodiment thereof when considered with reference to the attached drawings, in which.

DETAILED DESCRIPTION OF THE PREFERRED EMBODIMENT

Figure 1:
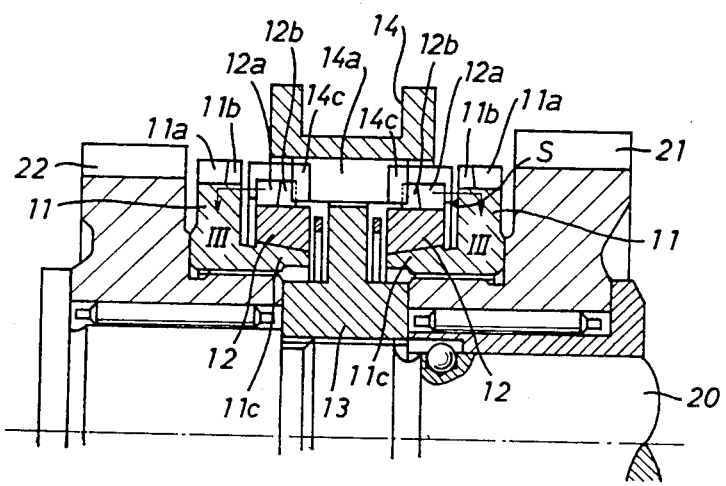
FIG. 1 illustrates in cross-sectional form one of the circumferentially equi-spaced parts of a gear synchronizer assembly according to the present invention.
Figure 2:
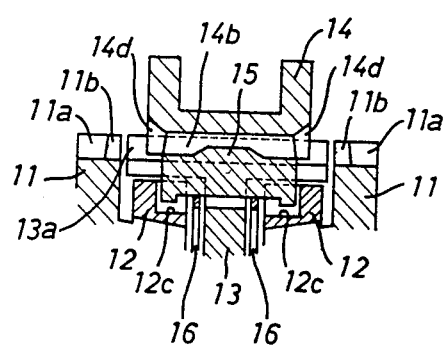
FIG. 2 illustrates in cross-sectional form one of the other circumferentially equi-spaced parts of the gear synchronizer assembly.

Referring now to the drawings, wherein like reference numerals represent the same or corresponding parts throughout the figures, and wherein FIG. 1 illustrates in cross-section one of the circumferentially equi-spaced three parts of a gear synchronizer assembly according to the present invention, and FIG. 2 illustrates in cross-section one of the other circumferentially equi-spaced three parts of the assembly. In FIG. 1, there is illustrated a transmission shaft 20, on which are rotatably supported a pair of change-speed gears 21 and 22. Disposed between the change-speed gears 21 and 22 is a pair of synchronizer assemblies which are operable to cause selective speed synchronization between the shaft 20 and the gears 21 and 22, respectively. As is illustrated in FIGS. 1 and 2, the synchronizer assemblies have a common hub assembly which includes a hub member 13, a plurality of circumferentially equi-spaced strut keys 15 and a pair of retainer springs 16. The synchronizer assemblies are arranged to be operated through a clutch sleeve 14 which is connected by a yoke groove to a conventional mechanical shift mechanism (not shown). The left-hand synchronizer assembly is substantially the same as the right-hand synchronizer assembly such that a detailed description of the right-hand synchronizer assembly only is believed necessary.

The right-hand synchronizer assembly includes a spline piece 11 and a synchronizer ring 12. The spline piece 11 is fixed to a hub portion of change-speed gear 21 by means of a spline connection to rotate therewith. The spline piece 11 is formed at its left end with a conical portion 11c and on its outer circumference with external splines 11a which are provided with a chamfer at each end as indicated at 11b. The synchronizer ring 12 is rotatably and axially slidably mounted on the conical portion 11c of spline piece 11 and has an internal conical surface for frictional engagement with the surface of the spline piece conical portion 11c. Thus, the synchronizer ring 12 cooperates with the spline piece conical portion 11c to provide a cone clutch in a well-known manner. The synchronizer ring 12 is formed on its outer circumference with external splines 12a which are provided with a chamfer at each end as indicated at 12b.

The hub member 13 is fixed to the transmission shaft 20 by means of a spline connection to rotate therewith. The hub member 13 is encircled by the clutch sleeve 14 and has external splines 13a which engage with an internal splined portion of clutch sleeve 14 to provide a driving connection. The internal splined portion of clutch sleeve 14 is in continual engagement with the external splines 13a of hub member 13 to be engaged with both the external splines 12a of synchronizer ring 12 and the external splines 11a of spline piece 11 in shifting operation. The strut keys 15 each have a raised central portion which engages a corresponding recess in the clutch sleeve 14 in a usual manner. The strut keys 15 each are engaged at their opposite ends in axially opposed slots 12c respectively formed in the synchronizer rings 12, 12 to intially urge the synchronizer ring 12 toward the conical portion 11c of spline piece 11 in shifting operation of the clutch sleeve 14. The retainer springs 16 are provided to urge the strut keys 15 radially outwardly into engagement with the clutch sleeve 14.

In this embodiment, the external splined portion 12a of synchronizer ring 12 is formed smaller in diameter than the external splined portion 11a of spline piece 11. The internal splined portion of clutch sleeve 14 includes first internal splines 14a engageable with the external splines 12a of synchronizer ring 12, and second internal splines 14b engageable with the external splines 11a of spline piece 11. The first internal splines 14a of clutch sleeve 14 are illustrated in FIG. 1, and the second internal splines 14b of clutch sleeve 14 are illustrated in FIG. 2. The first and second internal splines 14a and 14b are provided with a chamfer at each end as indicated at 14c, 14d, respectively. In such arrangement, the first internal splines 14a of clutch sleeve 14 are formed smaller in axial length than the second internal splines 14b of clutch sleeve 14. The other construction of the synchronizer assembly is substantially the same as that in a conventional synchronizer assembly of the well-known type.

When it is desired to engage the change-speed gear 21 to the transmission shaft 20, the clutch sleeve 14 is axially moved to the right by the operator. Initially, the strut keys 15 will move with the clutch sleeve 14 to abut against and urge the synchronizer ring 12 to the right which will first effect frictional engagement of the internal conical surface of synchronizer ring 12 and the surface of the spline piece conical portion 11c. When this frictional engagement takes place there will occur slight relative rotation between the synchronizer ring 12 and the spline piece 11 which will be effective to engage the chamfered ends 14c of the first internal splines 14a of clutch sleeve 14 with the chamfered ends 12b of synchronizer ring 12. If at this intial stage, the frictional engagement is larger than the indexing torque caused by engagement between the chamfered ends 12b and 14c, the axial movement of clutch sleeve 14 will be restricted to expedite sychronization. When the frictional engagement becomes smaller than the indexing torque, the synchronizer ring 12 will slightly rotate in reverse to permit the axial movement of clutch sleeve 14 to the right.

Figure 3:
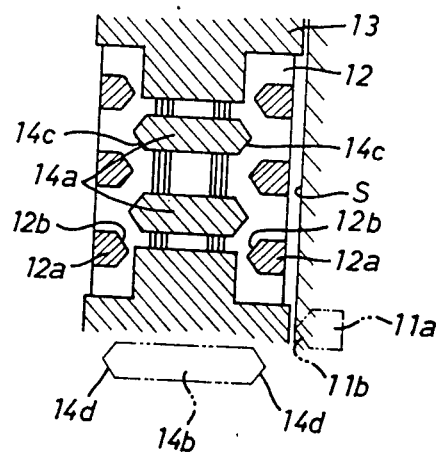
FIG. 3 is a partial view taken along line III—III in FIG. 1, showing the relative positions of the splines of the clutch sleeve, the synchronizer ring and the spline piece of FIGS. 1 and 2.

The axial movement of clutch sleeve 14 will be effective to make the chamfered ends 14c of the first internal splines 14a pass through the chamfered ends 12b of the external splines 12a on synchronizer ring 12. Simultaneously, the chamfered ends 14d of the second internal splines 14b of clutch sleeve 14 will engage the chamfered ends 11b of external splines 11a on spline piece 11. (see FIG. 3). Thus, the first internal splines 14a of clutch sleeve 14 will pass through the external splines 12a of synchronizer ring 12, and simultaneously the second internal splines 14b of clutch sleeve 14 will be brought into engagement with the external splines 11a of spline piece 11 to accomplish the synchronization. Therefore, the shift stroke of clutch sleeve 14 can be reduced to enhance an operational feel in shifting operation, and it is able to avoid increase of relative rotation between the clutch sleeve 14 and the spline piece 11.

In the above-described synchronizer assembly, it is advantageous that the chamfered ends 14c of first interal splines 14a can be formed in a simple manner with a sufficient flank because each end of the first internal splines 14a is displaced from each end of the second internal splines 14b in both the axial and radial directions. It is also advantageous that after sufficient engagement of the second internal splines 14b with the external splines 11a of spline piece 11, the radial surface of the first internal splines 14a will abut against a radial surface S of spline piece 11. Therefore, the radial surface S of spline piece 11 acts as a stopper in shifting operation.

Figure 4:
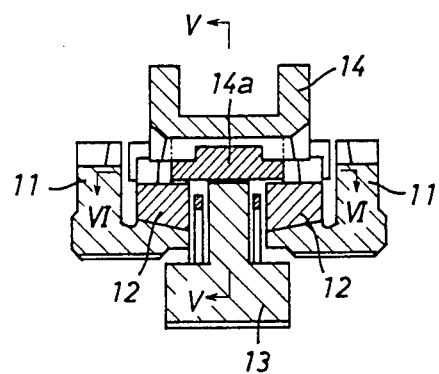
FIG. 4 illustrates in cross-sectional form a modification of the gear synchronizer assembly.
Figure 5:
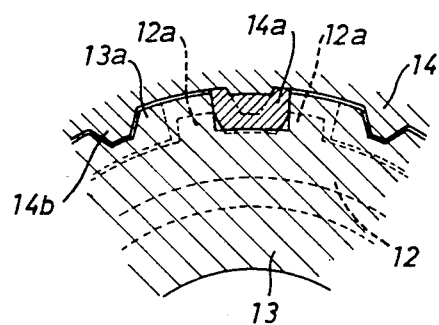
FIG. 5 is a sectional view taken along line V—V in FIG. 4.
Figure 6:
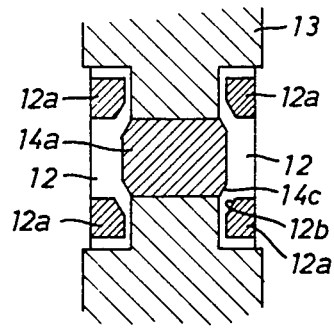
FIG. 6 is a sectional view taken along line VI—VI in FIG. 4.

In the actual practices of the present invention, the embodiment may be modified as illustrated in FIGS. 4 to 6, wherein the first internal splines 14a each are replaced with an internal spline piece fixedly coupled within the inner circumference of clutch sleeve 14. Other constructions of the modifications are substantially the same as those in the above embodiment.

While the invention is susceptible of various modifications and alternative constructions, a preferred embodiment is shown in the drawings and is herein described in detail. It is to be understood, however, that it is not thereby intended to limit the invention to the specific form disclosed. On the contrary it is intended to cover all modifications and alternative constructions falling within the spirit and scope of the invention as expressed in the applended claims.

What is claimed is:

1. In a synchronizer assembly comprising a gear member rotatable on a transmission shaft, an externally splined spline piece, with a conical portion formed at one side thereof, mounted on a hub portion of said gear member for rotating therewith, an externally splined synchronizer ring mounted on the conical portion of said spline piece for frictional engagement therewith, an externally splined hub member mounted on said shaft for rotation therewith, a clutch sleeve encircling said hub member and having an internally splined portion in continual engagement with the external splines of said hub member and axially shiftable toward and away from said spline piece to be engaged with the external splines of said synchronizer ring and said spline piece, and a plurality of circumferentially spaced strut keys assembled with the inner circumference of said clutch sleeve and loaded radially outwardly into engagement with said clutch sleeve to abut against and urge said synchronizer ring toward said spline piece in shifting operation of said clutch sleeve, the improvement wherein the externally splined portion of said synchronizer ring is formed smalled in diameter than the externally splined portion of said spline piece, and wherein the internally splined portion of said clutch sleeve includes a first set of internal splines engageable with the external splines of said synchronizer ring and a second set of internal splines engageable with the external splines of said spline piece, the first set of internal splines being formed smaller in axial length and larger in radial length than the second set of internal splines and being arranged to be brought into engagement with an end surface of said spline piece in shifting operation of said clutch sleeve toward said spline piece.

2. A gear synchronizer assembly according to claim 1, wherein the first and second set of internal splines of said clutch sleeve are chamfered at each end thereof, and the external splines of said synchronizer ring and said spline piece are chamfered at each end thereof to be engaged with the chamfered ends of said clutch sleeve respectively.

3. A gear synchronizer assembly according to claim 1, wherein said clutch sleeve is integrally formed with the first and second sets of internal splines.

4. A gear synchronizer assembly according to claim 1, wherein the first set of internal splines of said clutch sleeve are formed by an internal spline piece fixedly coupled within the inner circumference of said clutch sleeve.

* * * * *